US012786176B2

(12) United States Patent
Chen et al.

(10) Patent No.: US 12,786,176 B2
(45) Date of Patent: Nov. 3, 2026

(54) MANAGING ACCESS TO DIGITAL FILES IN A COMPUTING ENVIRONMENT

(71) Applicant: OnData, Inc., Austin, TX (US)

(72) Inventors: Shaofei Chen, Austin, TX (US); Daniel Cole Harrell, Colorado Springs, CO (US)

(73) Assignee: OnData, Inc., Austin, TX (US)

( * ) Notice: Subject to any disclaimer, the term of this patent is extended or adjusted under 35 U.S.C. 154(b) by 89 days.

(21) Appl. No.: 18/892,117

(22) Filed: Sep. 20, 2024

(65) Prior Publication Data

US 2026/0089142 A1 Mar. 26, 2026

(51) Int. Cl.
*H04L 9/40* (2022.01)

(52) U.S. Cl.
CPC ...... *H04L 63/0442* (2013.01); *H04L 63/0807* (2013.01); *H04L 63/102* (2013.01)

(58) Field of Classification Search
None
See application file for complete search history.

(56) References Cited

U.S. PATENT DOCUMENTS

| | | | | |
|---|---|---|---|---|
| 8,527,632 | B2 | 9/2013 | Donoghue et al. | |
| 8,689,015 | B2 | 4/2014 | Jeffries et al. | |
| 9,619,667 | B2 | 4/2017 | Yang et al. | |
| 9,781,083 | B2 | 10/2017 | Munshi et al. | |
| 10,404,667 | B2 | 9/2019 | Iyer et al. | |
| 10,489,600 | B2 | 11/2019 | Testerman et al. | |
| 11,405,203 | B2 | 8/2022 | Nelson et al. | |
| 2009/0122982 | A1 * | 5/2009 | Abrams | H04L 63/0428 380/45 |
| 2020/0136812 | A1 * | 4/2020 | Lim | H04L 9/0894 |
| 2022/0284113 | A1 | 9/2022 | Nelson et al. | |

FOREIGN PATENT DOCUMENTS

| | | |
|---|---|---|
| WO | 2023-079383 A1 | 5/2023 |

* cited by examiner

*Primary Examiner* — Jeffrey C Pwu
*Assistant Examiner* — Mayasa A. Shaawat
(74) *Attorney, Agent, or Firm* — McDermott Will & Schulte LLP

(57) ABSTRACT

Managing access to digital files in a computing environment, including facilitating protection of digital files; including facilitating the user experience for authentication, file encryption, file decryption, dynamic read access of protected files, dynamic write access of protected files, file cache management, and logging of access and updates to the protected files.

27 Claims, 11 Drawing Sheets

MANAGING ACCESS TO DIGITAL FILES IN A COMPUTING ENVIRONMENT

BACKGROUND

Field of the Disclosure

The disclosure relates generally to managing access to digital files in a computing environment.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Innovative aspects of the subject matter described in this specification may be embodied in a method of receiving, by a secure file computing module at a client computing device, a user token representing credentials of a user associated with the client computing device; detecting, by the secure file computing module, an attempt to access a file utilizing the client computing device, wherein the file is encrypted with a first encryption method; in response to detecting the attempt, identifying a header of the file, including identifying a file identifier (ID) and an organization identifier (ID) of the header; providing, by the client computing device and to a central management computing device, the file ID, the organization ID, a public key of a random key pair, and the user token; determining, by the central management computing device, that the user is authorized for the file based on i) the file ID and ii) the user token; in response to determining that the user is authorized for the file: obtaining, by the central management computing device and from a database, a cryptographic key; decrypting, by the central management computing device, the cryptographic key utilizing an organization private key, the organization private key stored in a secure location and associated with the organization ID; after decrypting the cryptographic key using the organization private key, encrypting, by the central management computing device, the cryptographic key using the random public key obtained from the client computing device; after encrypting the cryptographic key using the random public key, providing, by the central management computing device and to the client computing device, the cryptographic key; decrypting, by the secure file computing module, the cryptographic key using a private key of the random key pair; and after decrypting the cryptographic key using the private key, decrypting, by the secure file computing module, the file utilizing the cryptographic key.

Other embodiments of these aspects include corresponding systems, apparatus, and computer programs, configured to perform the actions of the methods, encoded on computer storage devices.

These and other embodiments may each optionally include one or more of the following features. For instance, the cryptographic key is a key used with an advanced cryptographic algorithm. In response to decrypting the file, launching a computer-executable application associated with the file to access the file at the client computing device. The file is stored at a storage device of the client computing device, an external storage device coupled to the client computing device, a cloud storage device that the client computing device is in communication with, and/or a third-party storage device at an external storage location. The first encryption method is agnostic to a type of the computer-executable application and/or a type of the file. Detecting, by the secure file computing module, an update to the file; in response to detecting the update, providing, by the secure file computing module, a communication to the central management computing device indicating the update to the file; and logging, by the central management computing device and at a storage device, the update to the file. Decrypting the file utilizing the cryptographic key further includes storing, by the secure file computing module, the decrypted file in a temporary storage location at the client computing device. In response to decrypting the file, encrypting, by the secure file computing module, the file at the temporary storage location with a second encryption method differing from the first encryption method. The file is decrypted utilizing the cryptographic key and the file is encrypted using the second encryption method concurrently. The second encryption method is associated with an operating system (OS) of the client computing device. Detecting a close of the file at the client computing device, and in response, removing, by the secure file computing module, the temporary storage location at the client computing device.

Transferring, by the client computing device, the encrypted file to another client computing device that is internal or external to an organization; when the another client computing device includes an another secure file computing module: receiving, by the another secure file computing module at the another client computing device, another user token representing credentials of another user associated with the another client computing device; detecting, by the another secure file computing module, another attempt to access the file utilizing the another client computing device; in response to detecting the another attempt, identifying the header of the file, including identifying the file ID and an another organization ID of the header; providing, by the another client computing device and to the central management computing device, the file ID, the another organization ID, a public key of a random key pair, and the another user token; determining, by the central management computing device that the another user is authorized for the file based on i) the file ID and ii) the another user token; in response to determining that the another user is authorized for the file: obtaining, by the central management computing device and from the database, the cryptographic key; decrypting, by the central management computing device, the cryptographic key utilizing an another organization private key, the another organization private key stored in the secure location and associated with the another organization ID; after decrypting the cryptographic key using the another organization private key, encrypting, by the central management computing device, the cryptographic key using the random public key obtained from the another client computing device; after encrypting the cryptographic key using the random public key, providing, by the central management computing device and to the another client computing device, the cryptographic key; decrypting, by the another secure file computing module, the cryptographic key using a private key of the random key pair; and after decrypting the cryptographic key using the private key, decrypting, by the another secure file computing module, the file utilizing the cryptographic key.

The another organization and the organization are the same, the another organization ID and the organization ID are the same, and the another organization private key and the organization private key are the same. The another organization and the organization are different, the another organization ID and the organization ID are different, and the another organization private key and the organization private key are different. Determining, by the central management computing device, that the another user is not authorized for the file based on i) the file ID and ii) the another user token; and in response to determining that the another user is not authorized for the file, not enabling decryption of the file at the another client computing device. When the another client computing device does not include the another secure file computing module, not enabling decryption of the file at the another client computing device. In response to transferring the file to the another computing device, providing, by the secure file computing module, a communication to the central management computing device indicating the transfer of the file to the another computing device; and logging, by the central management computing device and at a storage device, the transfer of the file to the another computing device. Transferring the file to the another computing device includes transferring the file to the another computing device via an electronic mail communication. Marking, by the secure file computing module, the file as offline accessible; configuring the file, by the secure file computing module, to indicate i) a maximum number of attempts the file can be accessed when the client computing device is not connected to the central management computing device and ii) an expiration time to access the file; encrypting, by the secure file computing module, the file encryption key, the maximum access attempts, and the expiration time using a user provided password into an encrypted information bundle; and updating, by the secure file computing module, the header of the file to include the encrypted information bundle.

Detecting, by the secure file computing module, an attempt to access the file; in response to detecting the attempt to access the file, determining that the client computing device is not connected to the central management computing device; in response to determining that the client computing device is not connected to the central management computing device: obtaining user input indicating the password associated with the file; decrypting, by the secure file computing module, the encryption key based on the password; validating, by the secure file computing module, that i) the access attempt count of the file is less than the maximum number of attempts and ii) the expiration time has not expired; in response to the validation, decrypting, by the secure file computing module, the file using the encryption key; and in response to decrypting the file, launching a computer-executable application associated with the file to access the file utilizing the client computing device.

Encrypting the file, including: generating, by the secure file computing module, the cryptographic key; updating, by the secure file computing module, a file extension of the file; obtaining, by the secure file computing module and from the central management computing module, the file ID; updating, by the secure file computing module, the header of the file to include the organization ID, and the file ID; encrypting, by the secure file computing module, the file utilizing the cryptographic key; and storing, by the secure file computing module, the file. Monitoring, by the secure file computing module, one or more data sources; identifying, based on the monitoring and by the secure file computing module, one or more files, including the file; extracting, by the secure file computing module, text from the file; identifying, by a data analyzer computing module and based on the text of the file, one or more categories of the file; determining, by the central management computing module and based on a mapping, a data classification of the file based on the categories of the file; determining, by the central management computing module, that the data protection rules indicate encryption of the file; and encrypting, by the secure file computing module, the file based on the indication of encryption of the file per the data protection rules.

Determining the data classification of the file based on the categories of the file is performed utilizing machine learning, artificial intelligence, pattern matching, or a combination of those. Determining, by the central management computing module, that the user is authorized for the file further includes: identifying, based on the user token, a user-specific data access role associated with the user; comparing, by the central management computing device, the user-specific data access role indicated by the token with one or more user-specific data access roles associated with the file that are indicated as authorized for access to the file; and determining, based on the comparing and by the central management computing device, that the user is authorized for the file. Determining that the user is authorized for the file includes determining that the user has read-only access to the file, or write/read access to the file.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
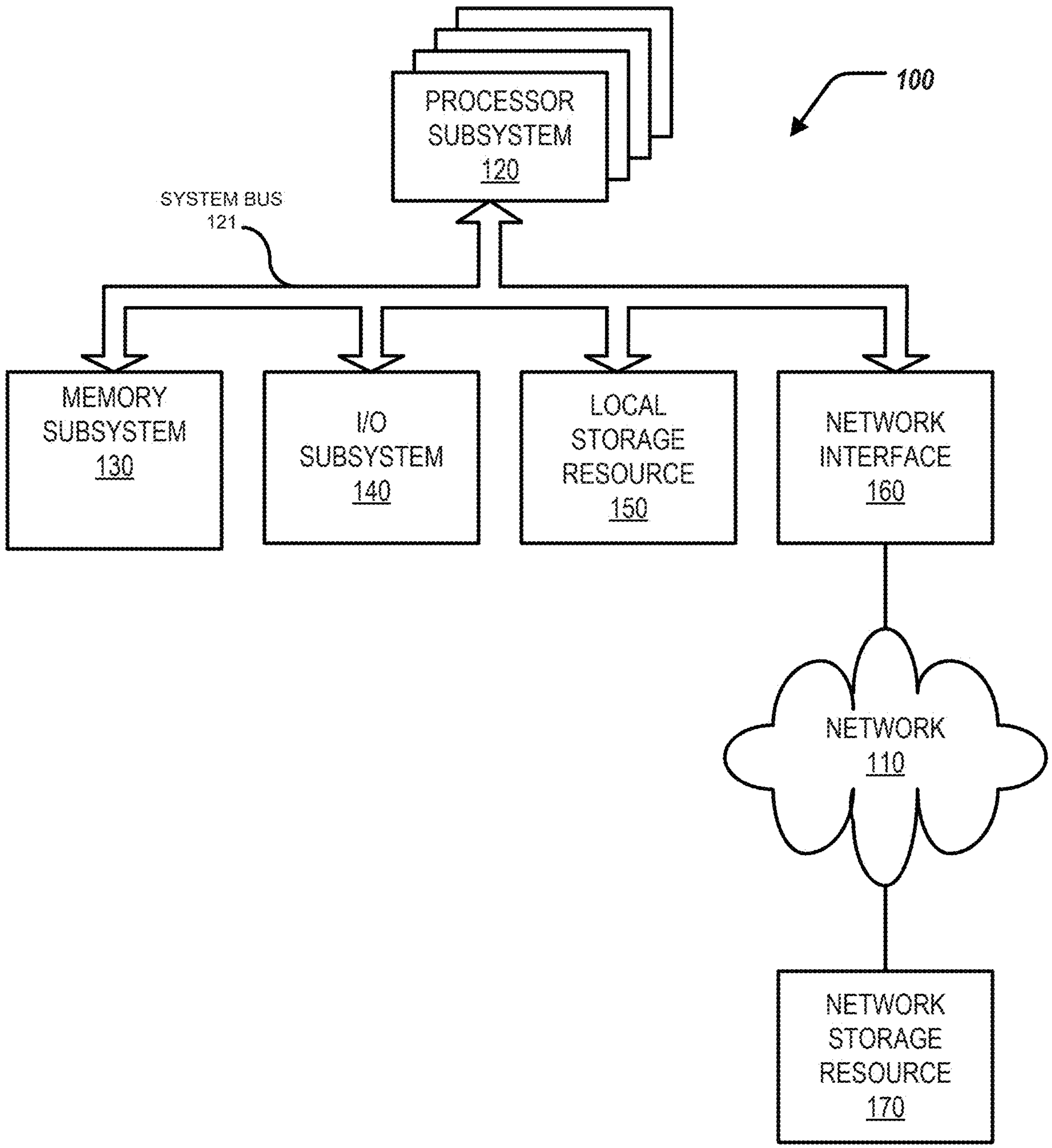
FIG. 1 is a block diagram of selected elements of an embodiment of a computing device.

This disclosure discusses methods and systems for managing access to digital files in a computing environment. In short, this disclosure discusses facilitating protection of digital files; including facilitating the user experience for authentication, file encryption, file decryption, dynamic read access of protected files, dynamic write access of protected files, file cache management, and logging of access and updates to the protected files, described further herein.

Specifically, this disclosure discusses a system and a method for receiving, by a secure file computing module at a client computing device, a user token representing credentials of a user associated with the client computing device; detecting, by the secure file computing module, an attempt to access a file utilizing the client computing device, wherein the file is encrypted with a first encryption method; in response to detecting the attempt, identifying a header of the file, including identifying a file identifier (ID) and an organization identifier (ID) of the header; providing, by the client computing device and to a central management computing device, the file ID, the organization ID, a public key of a random key pair, and the user token; determining, by the central management computing device, that the user is authorized for the file based on i) the file ID and ii) the user token; in response to determining that the user is authorized for the file: obtaining, by the central management computing device and from a database, a cryptographic key; decrypting, by the central management computing device, the cryptographic key utilizing an organization private key, the organization private key stored in a secure location and associated with the organization ID; after decrypting the cryptographic key using the organization private key, encrypting, by the central management computing device, the cryptographic key using the random public key obtained from the client computing device; after encrypting the cryptographic key using the random public key, providing, by the central management computing device and to the client computing device, the cryptographic key; decrypting, by the secure file computing module, the cryptographic key using a private key of the random key pair; and after decrypting the cryptographic key using the private key, decrypting, by the secure file computing module, the file utilizing the cryptographic key.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such as wires, optical fibers, microwaves, radio waves, and other electromagnetic and/or optical carriers; and/or any combination of the foregoing.

Particular embodiments are best understood by reference to FIGS. 1-7 wherein like numbers are used to indicate like and corresponding parts.

Turning now to the drawings, FIG. 1 illustrates a block diagram depicting selected elements of a computing device 100 in accordance with some embodiments of the present disclosure. In various embodiments, computing device 100 may represent different types of portable computing devices, such as, display devices, head mounted displays, head mount display systems, smart phones, tablet computers, notebook computers, media players, digital cameras, 2-in-1 tablet-laptop combination computers, and wireless organizers, or other types of portable computing devices. In one or more embodiments, computing device 100 may also represent other types of computing devices, including desktop computers, server systems, controllers, and microcontroller units, among other types of computing devices. Components of computing device 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of the computing device). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated computing device, such as system 100, is powered down.

In computing device 100, I/O subsystem 140 may comprise a system, device, or apparatus generally operable to receive and/or transmit data to/from/within computing device 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other types of rotating storage media, flash memory, EEPROM, and/or other types of solid state storage media) and may be generally operable to store instructions and/or data.

In FIG. 1, network interface 160 may be a suitable system, apparatus, or device operable to serve as an interface between computing device 100 and a network 110. Network interface 160 may enable computing device 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g., corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from computing device 100.

In particular embodiments, network 110 may include one or more routers for routing data between client computing devices 100 and server computing devices 100. A device (e.g., a client computing device 100 or a server computing device 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g., customer sites) or subnets. As an example, a corporate network may include potentially thousands of offices or branches, each with its own subnet (or multiple subnets) having many devices. One or more client computing devices 100 may communicate with one or more server computing devices 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

Environment Overview

Figure 2:
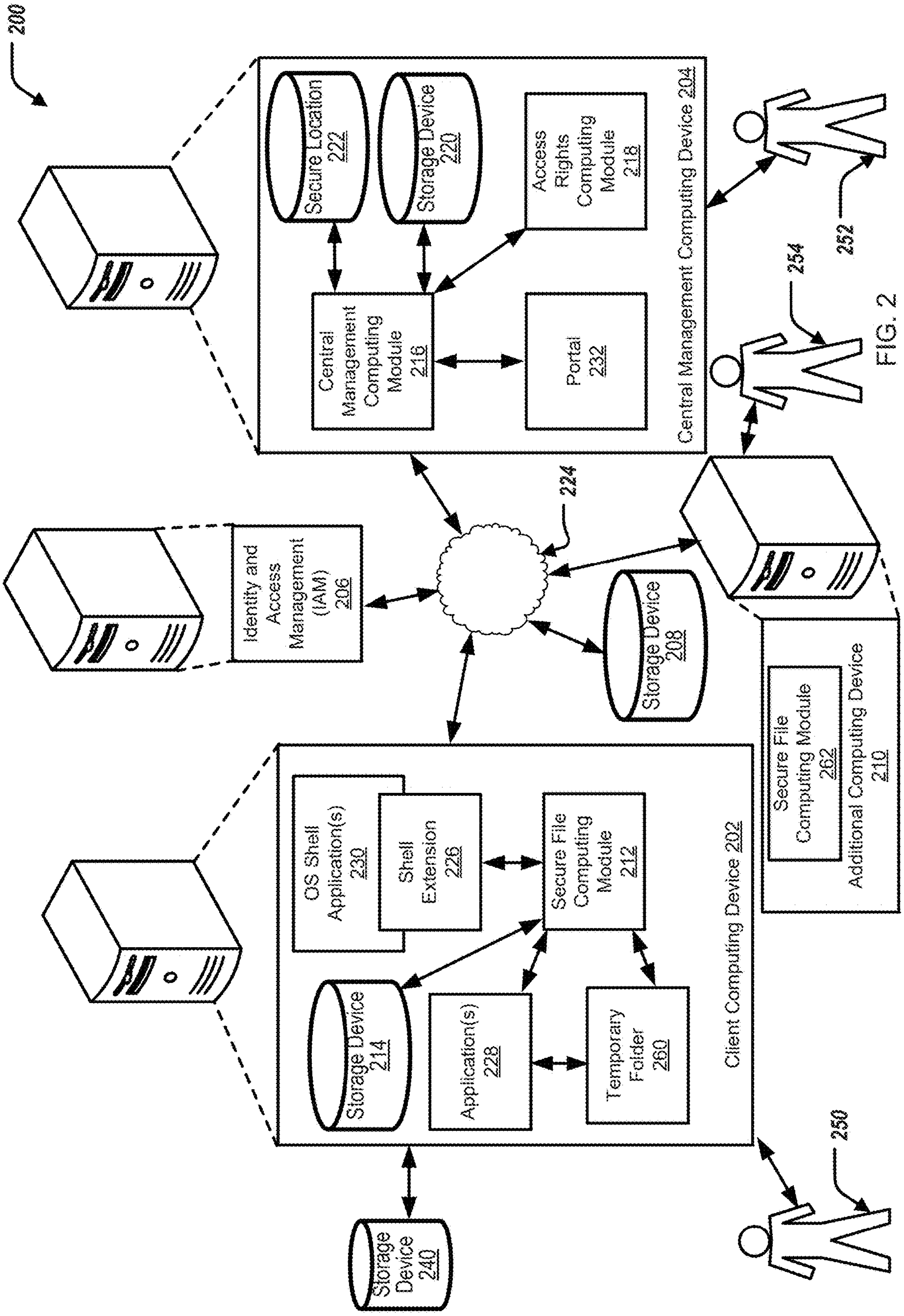
FIG. 2 illustrates a block diagram of a computing environment including multiple computing devices.

Turning to FIG. 2, FIG. 2 illustrates an environment 200 including a client computing device 202, a central management computing device 204, an identity and access management (IAM) computing device 206, a storage device 208, and an additional client computing device 210.

The client computing device 202 can include a secure file computing module 212 and a storage device 214. The client computing device 202 can further be in direct communication with an external storage device 240 (e.g., external hard drive or external USB storage device). The central management computing device 204 can include a central management computing module 216, an access rights computing module 218, a storage device 220, and a secure location 222.

Any of the client computing device 202, the central management computing device 204, the IAM computing device 206, the storage device 208 and the additional computing device 210 can be in communication with any of the other of the client computing device 202, the central management computing device 204, the IAM computing device 206, the storage device 208 and the additional computing device 210 over a network 224 (e.g., the "web" or the "Internet").

Any of the client computing device 202, the central management computing device 204, the IAM computing device 206, and the additional computing device 210 can be similar to, or include, the computing device 100 of FIG. 1.

A user 250 (e.g., end user) can interact with the client computing device 202. A user 252 (e.g., administrator or sysadmin) can interact with the central management computing device 204.

In short, the secure file computing module 212 can facilitate protection of digital files (such as unstructured or structured files). The file(s) can be stored at one or more of the storage device 214, the storage device 240, the storage device 208, a third-party storage device, or a combination thereof. The secure file computing module 212 can facilitate the user experience for authentication, file encryption, file decryption, dynamic read access of protected files, dynamic write access of protected files, file cache management, and logging of access and updates to the protected files, described further herein.

The secure file computing module 212 can interact with OS shell applications 230 (provided by the Operating System of the client computing device 202), such as Windows Explorer on Windows and Finder on macOS. The secure file computing module 212 can integrate with the OS shell applications 230 to seamlessly open, read, edit, and/or save an encrypted file, and integrate with the IAM computing device 206 for user authentication and authorization, as described further herein. In other words, the secure file computing module 212 can facilitate user authentication, permission management, file encryption, file decryption, launching of third-party computer-implemented applications (based on the original file extension of the protected file), and interaction with a portal 232 of the central management computing device 204, described further herein.

Registration

Figure 3:
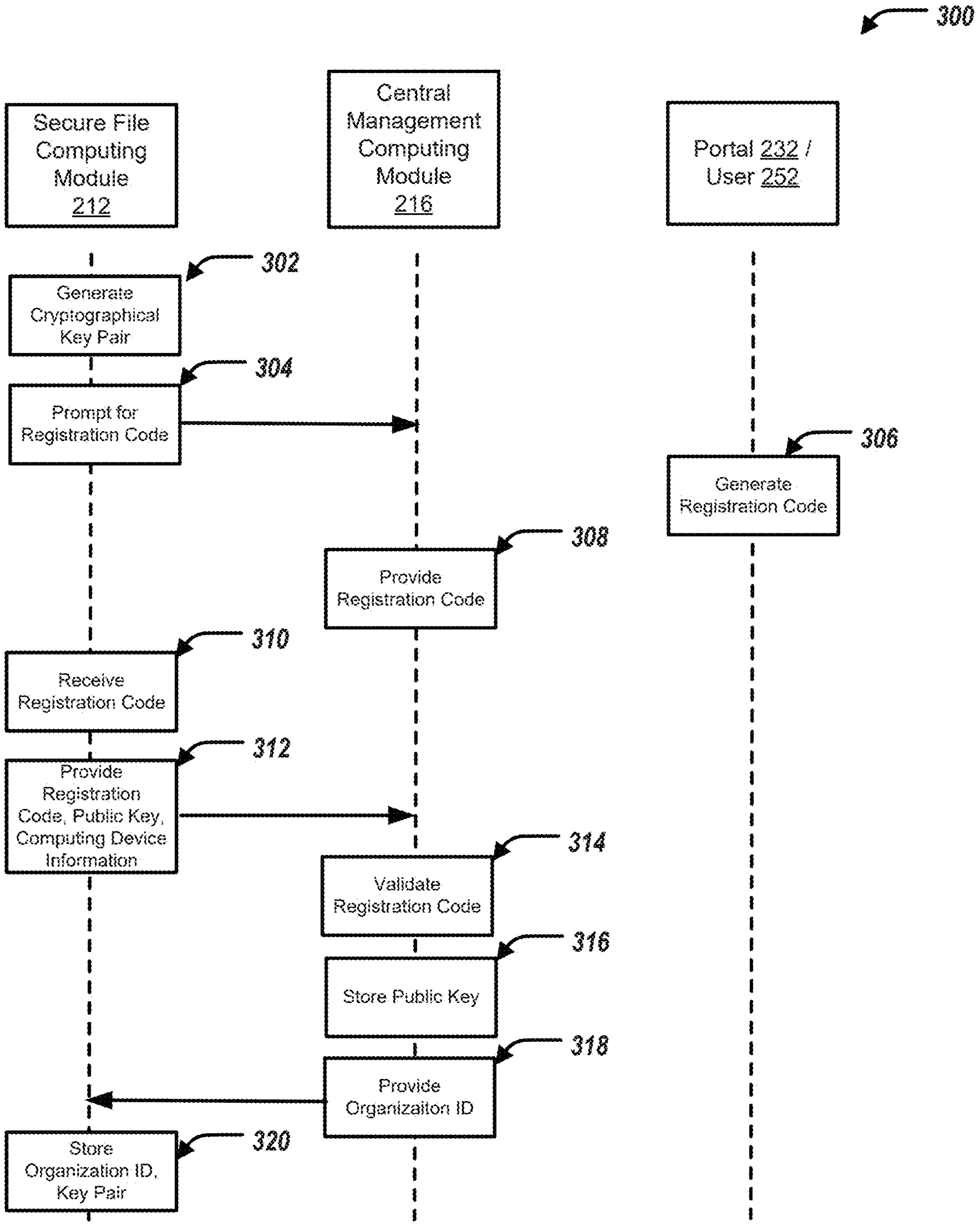
FIG. 3 illustrates a swim-lane diagram of registration of a client computing device.

FIG. 3 illustrates a swim-lane diagram depicting selected elements of an embodiment of a method 300 for registration of a client computing device. The method 300 may be performed by the client computing device 202, the central management computing device 204, the IAM computing device 206, and the additional computing device 210, and with reference to FIGS. 1-2. It is noted that certain operations described in method 300 may be optional or may be rearranged in different embodiments.

In short, to enhance the security of the protected files, the protected files are only to be accessed by computing devices that are registered (internal network), or computing devices that are given explicit access to the protected files (external network). If a computing device is not registered (e.g., to an organization account managed by the central management computing device 204), the central management computing device 204 cannot authenticate the computing device and will not respond to any requests from that computing device, and thus that computing device cannot be used to access the protected file.

Method 300 illustrates registration of the client computing device 202. Specifically, the secure file computing module 212 generates an asymmetric cryptographical key pair, at 302. The cryptographical key pair represents the credentials of the client computing device 202. The secure file computing module 212 will prompt for a registration code from the central management computing device 204, at 304. The user 252 (system administrator, or sysadmin), via the portal 232, generates, or provides, the registration code, at 306. The registration code can be generated by the portal 232, and can be a random registration code. In some examples, the registration code can expire within a particular timeframe. The central management computing module 216 provides the registration code to the user 250, at 308. For example, the registration code can be provided to the user 250 via the client computing device 202, or a third-party computing device (e.g., smartphone) that is associated with the user 250. For example, the registration code can be provided as a notification or a text message to the user 250. The secure file computing module 212 receives the registration code, at 310. The user 250 can enter the registration code at the client computing device 202. The secure file computing module 212 can provide a registration request to the central management computing module 216, including providing the public key of the generated cryptographical key pair, the registration code, and any relevant information (e.g., identifiers) associated with the client computing device 202 to the central management computing module 216, at 312. The central management computing module 216 validates the registration code, at 314. The central management computing module 216 stores the public key as the credential for an organization (client), e.g., at the secure location 222, at 316. The central management computing module 216 provides an organization identifier (organization ID) to the secure file computing module 212, at 318. The organization ID can be based on the public key and the information associated with the client computing device 202. The secure file computing module 212 stores the organization ID and the key pair (client credential) at the client computing device 202 (e.g., at the storage device 214), at 320. After successful registration, the secure file computing module 212 can authenticate itself with the central management computing device 204 and the central management computing module 216. After successful registration, the user 252 can identify, via the portal 232, an indication that the secure file computing module 212 and the client computing device 202 are registered with the central management computing device 204.

Decryption Management

Figure 4A:
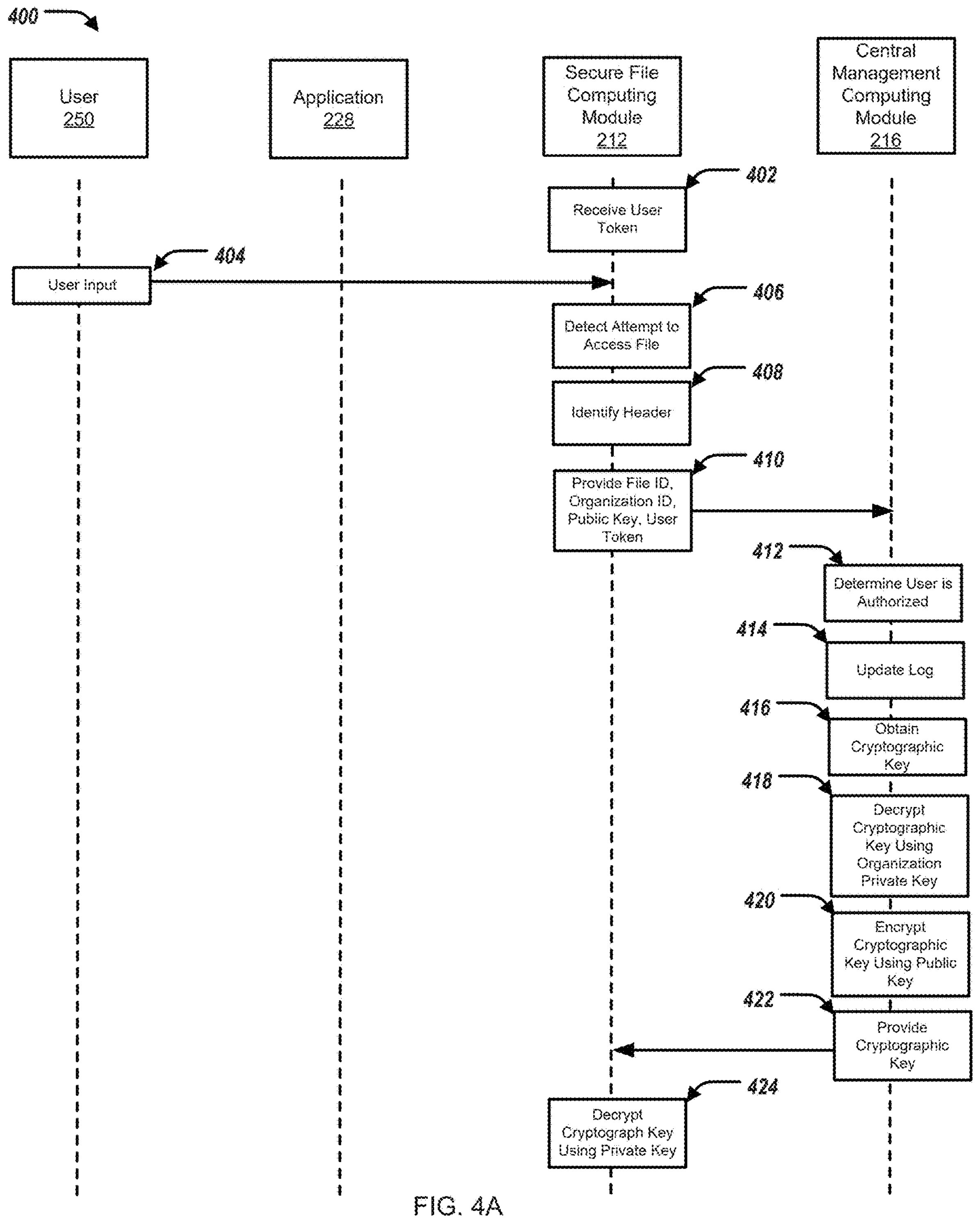
FIGS. 4A, 4B, 4C illustrate a swim-lane diagram of managing access rights to digital files.
Figure 4B:
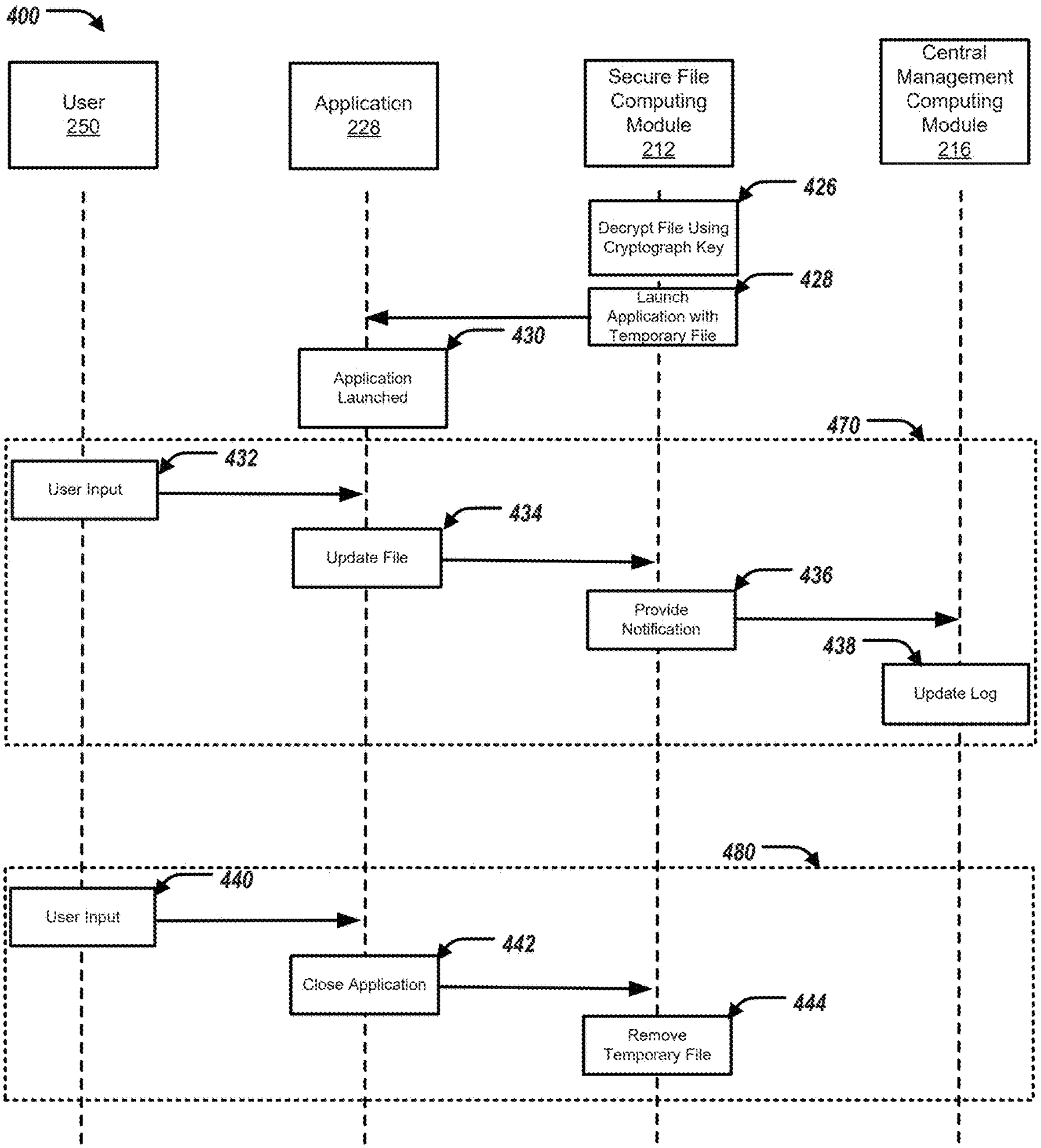
Figure 4C:
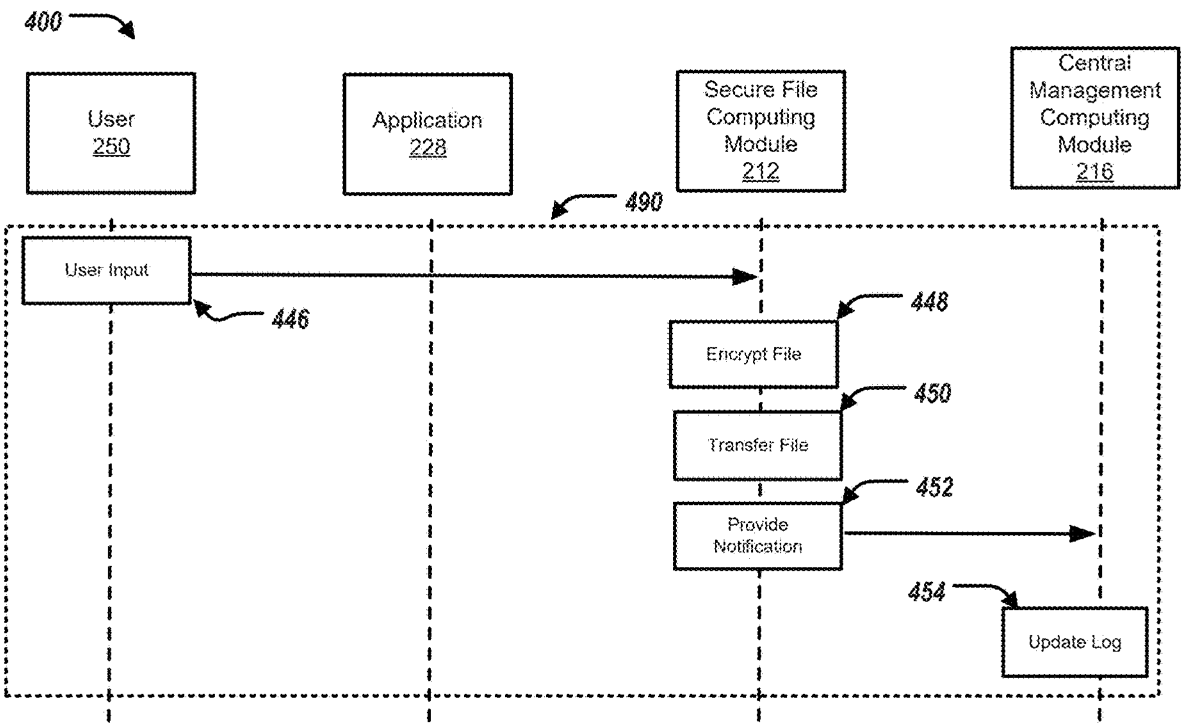

FIGS. 4A, 4B, 4C illustrate a swim-lane diagram depicting selected elements of an embodiment of a method 400 of managing access rights to digital files. The method 400 may be performed by the client computing device 202, the central management computing device 204, the IAM computing device 206, and the additional computing device 210, and with reference to FIGS. 1-2. It is noted that certain operations described in method 400 may be optional or may be rearranged in different embodiments.

The secure file computing module 212 receives a user token, at 402. The user token represents credentials of the user 250 associated with the client computing device 202. The secure file computing module 212 can receive the user token from the IAM computing device 206. For example, the user 250 can provide credentials at the client computing device 202 (e.g., login name and password). The IAM computing device 206 can verify/authenticate the credentials for the user 250, and generate the token to transmit to the secure file computing module 212. Other types of credentials can be used, such as multifactor authentication (MFA).

The user 250 can provide user input, at 404. That is, the user 250 can interact with the client computing device 202 and provide user input (e.g., via a keyboard or mouse of the client computing device 202). In some examples, the user input can indicate an attempt to access a file. In short, the shell extension 226 can indicate (via a graphical user interface at the client computing device 202) an illustration of an overlay on an icon representing the file to indicate that the file is encrypted. The shell extension 226 can provide a contextual menu to open, encrypt, and/or decrypt the file.

The secure file computing module 212 can detect the attempt to access the file utilizing the client computing device 202, at 406. The file is encrypted with a first encryption method. In some examples, the first encryption method is agnostic to a type of a computer-executable application 228 that the file is associated with, and/or agnostic to a type of the file. That is, the first encryption method is independent to a type of a computer-executable application 228 that the file is associated with, and/or agnostic to a type of the file. The first encryption method is independent of, or agnostic to, the OS of the client computing device 202. In other words, the first encryption method is not native (non-native) to the client computing device 202. In some examples, the file includes an extension indicating that the file is encrypted with the first encryption method. For example, the file name of the file can include filename.appextension.encryptionextension—the appextension can indicate which application 228 is associated with the file, and the encryptionextension can include that the file is encrypted with the first encryption method. For example, for a file that is a text document and the encryption extension of a first encryption method is .enc, the file name can filename.txt.enc.

The file can be stored at one or more of the storage device 214, the storage device 240, the storage device 208, a third-party storage device, or a combination thereof. The client computing device 202 can access the file stored at one or more of the storage device 214, the storage device 240, the storage device 208, a third-party storage device, or a combination thereof.

The secure file computing module 212 can identify, in response to detecting the attempt to access the file, a header of the file, at 408. Specifically, the secure file computing module 212 can identify a file identifier (ID) and an organization identifier (ID) of the header. That is, the secure file computing module 212 reads the header of the file (e.g., 4096 bytes) and retrieves the metadata of the file, including the organization ID, the file ID, the file hash, and initialization vector (IV).

The secure file computing module 212 provides, to the central management computing module 216, the file ID, the organization ID, a public key of a random key pair, and the user token, at 410. The secure file computing module 212 generates the random key pair (RSA key pair).

The central management computing module 216 determines that the user 250 is authorized for the file, at 412. That is, the central management computing module 216 determines that the user 250 is authorized for the file based on i) the file ID and ii) the user token. Specifically, the central management computing module 216 identifies, based on the user token, a user-specific data access role associated with the user 250. The central management computing module 216 further compares the user-specific data role indicated by the token with one or more user-specific data access roles associated with the file that are indicated as authorized for access to the file. For example, the storage device 220 can indicate, for the file and the file ID, the file ID and data access roles for the file ID that are authorized access to the file (i.e., in a relational table). The central management computing module 216 determines, based on the comparing, that the user 250 is authorized for the file. That is, the storage device 220 can indicate, per a table, that for the file ID, that the user token is authorized for the file. For example, determining, by the central management computing module 216, that the user 250 is authorized for the file includes determining that the user 250 has read-only access to the file (e.g., permission to open the encrypted file but not write to the encrypted file), or write/read access to the file (e.g., permission to open the encrypted file and write to the encrypted file; permission to decrypt the encrypted file).

The central management computing module 216, in response to determining that the user 250 is authorized for the file, updates a log stored at the storage device 220, at 414. In particular, the central management computing module 216 updates the log to indicate for the file ID of the file being accessed by the user 250 at the client computing device 202 and a time of access. The log can indicate lineage of the file, including a comprehensive log of all file operations including encryption, decryption, deletion, and modification of the file; and further log to track all events of the file, such as read access to the file and write access to the file. The log can indicate a location (or locations) of the file, and historical locations of the file. The log can indicate updates to metadata of the file, or updates to the file. The log is searchable and sortable based on such parameters as which user accessed the file, which computing device accessed the file, and a time of access.

The central management computing module 216, further in response to determining that the user 250 is authorized for the file, obtains from the secure location 222, a cryptographic key, at 416. In particular, the cryptographic key is encrypted—an encrypted cryptographic key. The cryptographic key is a key used with an advanced cryptographic algorithm. In some examples, the cryptographic key is an advanced encryption standard (AES) cryptographic key, or an AES 256 cryptographic key.

The central management computing module 216 decrypts the encrypted cryptographic key, at 418. That is, the central management computing module 216 decrypts the encrypted cryptographic key utilizing an organization private key—a decrypted cryptographic key. The organization private key is stored at the secure location 222 and is associated with the organization ID (that was included by the header of the file).

The central management computing module 216, after decrypting the encrypted cryptographic key using the organization private key, encrypts the decrypted cryptographic key using the random public key obtained from the client computing device 202, at 420. Specifically, the random public key sent by the secure file computing module 212 at step 410 is used to encrypt the decrypted cryptographic key—to generate an encrypted cryptographic key.

The central management computing module 216, after encrypting the decrypted cryptographic key using the random public key, provides, to the secure file computing module 212, the encrypted cryptographic key, at 422. In some examples, when the protected (original) file is preserved, the secure file computing module 212 copies the file to a new file using the same file name, but without the encryption extension, and clears all contents in the new file. For example, continuing the example above, when the file name is filename.txt.enc, the secure file computing module 212 copies the file to a new file with the file name filename.txt. In some examples, when the protected (original) file is not preserved, the secure file computing module 212 copies the file to a new file using the same file name, plus a backup file extension. For example, the backup file extension can be .bak. For example, the backup file extension can indicate the file is hidden (e.g., hidden from access/view by the user 250)—a hidden file. For example, continuing the example above, when the file name is filename.txt.enc, the secure file computing module 212 copies the file to a new file name with the file name filename.txt.bak. Further, the secure file computing module 212 clears all contents in the protected (original) file and renames the file by removing the encryption extension. Continuing the example, the secure file computing module 212 renames the file name from filename.txt.enc to filename.txt.

The secure file computing module 212 decrypts the cryptographic key, at 424. Specifically, the secure file computing module 212 decrypts the cryptographic key using a private key of the random key pair. That is, the secure file computing module decrypts the cryptographic key using the private key of the random key pair that corresponds to the public key that was provided to the central management computing module 216 (at 410). In some examples, the secure file computing module 212 uses the private key to decrypt an AES cryptographic key.

The secure file computing module 212, after decrypting the encrypted cryptographic key using the private key, decrypts the file utilizing the cryptographic key (the decrypted cryptographic key), at 426. In some examples, the secure file computing module 212 utilizes the cryptographic key and the initialization vector (IV) to decrypt the encrypted file contents of the file. In some examples, when the protected (original) file is preserved, the secure file computing module 212 utilizes the cryptographic key to decrypt the original file and write to the new file. Continuing the example above, the secure file computing module 212 utilizes the cryptographic key to decrypt the file filename.txt.enc, and write to the file filename.txt. In some examples, when the protected (original) file is not preserved, the secure file computing module 212 utilizes the cryptographic key to decrypt the hidden file and write to the new file. Continuing the example above, the secure file computing module 212 utilizes the cryptographic key to decrypt the contents from the file filename.txt.bak, and write to file filename.txt. The secure file computing module 212 then deletes the hidden file (e.g., the filename.txt.bak file).

The secure file computing module 212, in response to decrypting the file, launches a computer-executable application 228 associated with the file to access the file at the client computing device 202, at 428. The computer-executable application 228 is launched at the client computing device 202 to provide access to the file at the client computing device 202, at 430.

In some examples, when the secure file computing module 212 decrypts the file utilizing the cryptographic key, the secure file computing module 212 stores the decrypted file in a temporary storage location at the client computing device 202. For example, the secure file computing module 212 stores the decrypted file at a temporary folder 260.

In some examples, when the secure file computing module 212 decrypts the file utilizing the cryptographic key, the secure file computing module 212 encrypts the file at the temporary storage location with a second encryption method that differs from the first encryption method. For example, the secure file computing module 212 encrypts the file stored at the temporary folder 260 with the second encryption method that differs from the first encryption method. In some examples, the temporary folder 260 is encrypted—that is, all of the contents of the temporary folder 260 is encrypted (the temporary folder 260 is "marked" as encrypted). In some examples, the second encryption method is associated with the OS of the client computing device 202. That is, the second encryption method is an OS-based encryption method. That is, the second encryption method is implemented at least partially by the OS of the client computing device 202. In other words, the second encryption method is native to the OS and native to the client computing device 202.

In some examples, the secure file computing module 212 decrypts the file utilizing the decrypted cryptographic key concurrently with encrypting the file using the second encryption method. In some examples, the secure file computing module 212 decrypts the file utilizing the decrypted cryptographic key substantially concurrently with encrypting the file using the second encryption method. In some examples, the secure file computing module 212 decrypts the file utilizing the decrypted cryptographic key prior to encrypting the file using the second encryption method.

Continuing with method 400, in some examples, after the application is launched at 430, method 400 can optionally proceed to perform the steps shown within 470. Specifically, the user 250 provides user input at the client computing device 202, at 432. The user input can include any type of modifications or updates to the decrypted file stored at the temporary location. The application 228 updates the file (e.g., stored at the temporary location—temporary folder 260), at 434. The secure file computing module 212 provides a notification of the update to the file to the central management computing module 216, at 436. The central management computing module 216 updates the log stored at the storage device 220, at 438. Specifically, the central management computing module 216 updates the log to indicate the updates to the file associated with the file ID. The updates to the log can indicate parameters such as what actions were taken (edits, updates); what specific actions were taken (the exact edits/updates); where the updates happened (which computing devices—e.g., the client computing device 202); who made the updates (which user—e.g., the user 250); what time the updates were made; and the like. The updates to the log can log all file operations, such as encryptions and decryptions of the file.

To that end, the log (stored at the storage device 220) can include a searchable table and/or database. The client computing device 202 or any computing device 202 that is provided access to the central management computing device 204 and the log at the storage device can search the searchable log based on any of the parameters.

Continuing with method 400, in some examples, after the application is launched at 430, method 400 can optionally proceed to perform the steps shown within 480. Specifically, the user 250 provides user input at the client computing device 202, at 440. In some examples, the user input can include a close of the file and/or a close of the application 228. That is, the user input can indicate a cease of access to the file and/or the application 228. The application 228 can detect a close of the file at the client computing device 202, at 442. The secure file computing module 212, in response to the application 228 detecting the close of the file, removes the temporary storage location at the client computing device 202, at 444.

Continuing with method 400, in some examples, after the application is launched at 430, method 400 can optionally proceed to perform the steps shown within 490. Specifically, the user 250 provides user input at the client computing device 202, at 446. In some examples, the user input can indicate a transfer of the file from the client computing device 202 to another computing device (i.e., internal or external to an organization that the client computing device 202 is a part of), described further herein. The secure file computing module 212, in response to the user input indicating the transfer of the file, can encrypt the file, at 448. The secure file computing module 212 can encrypt the file as further described herein. The secure file computing module 212 can transfer the file to another computing device, at 450, as further described herein. The secure file computing module 212 can provide a notification to the central management computing module 216 indicating the transfer of the file to another computing device, at 452. The central management computing module 216 can update the log, stored at the storage device 220, to indicate the transfer of the file to the another computing device, at 454.

File Sharing

In some further implementations, the client computing device 202 can share the file with the additional computing device 210. Specifically, the client computing device 202 can transfer the encrypted file to the additional computing device 210 that is internal or external to an organization that the client computing device 202 is a part of. When the additional computing device 210 is internal to the organization that the client computing device 202 is a part of, the additional computing device 210 and the client computing device 202 are part of the same "eco-system" of computing devices that share the same organization ID. When the additional computing device 210 is external to the organization that the client computing device 202 is a part of, the additional computing device 210 and the client computing device 202 are not part of the same "eco-system" and are associated with differing organization IDs. For example, the additional computing device 210 and the client computing device 202 are connected externally via the network 224. The additional client computing device 210 can include an additional secure file computing module 262, similar to the secure file computing module 212 of the client computing device 202.

The additional secure file computing module 262 can receive an additional user token representing credentials of an additional user 254 associated with the additional client computing device 210. The additional secure file computing module 262 can receive the user token from the IAM computing device 206. For example, the user 254 can provide credentials at the additional client computing device 210 (e.g., login name and password). The IAM computing device 206 can verify/authenticate the credentials for the user 254, and generate the additional token to transmit to the additional secure file computing module 262. Other types of credentials can be used, such as multifactor authentication (MFA).

The additional secure file computing module 262 detects another attempt to access the file utilizing the additional client computing device 210. The additional secure file computing module 262 can identify, in response to detecting the another attempt to access the file, the header of the file. Specifically, the additional secure file computing module 262 can identify the file ID and an additional organization identifier (ID) of the header. That is, the additional secure file computing module 262 reads the header of the file and retrieves the metadata of the file, including the another organization ID, the file ID, the file hash, and initialization vector (IV).

The additional secure file computing module 262 provides, to the central management computing module 216, the file ID, the another organization ID, a public key of a random key pair, and the additional user token. The additional secure file computing module 262 generates the random key pair (RSA key pair).

The central management computing module 216 determines that the additional user 254 is authorized for the file. That is, the central management computing module 216 determines that the additional user 254 is authorized for the file based on i) the file ID and ii) the additional user token. Specifically, the central management computing module 216 identifies, based on the additional user token, a user-specific data access role associated with the additional user 254. The central management computing module 216 further compares the user-specific data role indicated by the additional token with one or more user-specific data access roles associated with the file that are indicated as authorized for access to the file. For example, the storage device 220 can indicate, for the file and the file ID, the file ID and data access roles for the file ID that are authorized access to the file (i.e., in a relational table). The central management computing module 216 determines, based on the comparing, that the additional user 254 is authorized for the file. That is, the storage device 220 can indicate, per a table, that for the file ID, that the additional user token is authorized for the file. For example, determining, by the central management computing module 216, that the additional user 254 is authorized for the file includes determining that the additional user 254 has read-only access to the file (e.g., permission to open the encrypted file but not write to the encrypted file), or write/read access to the file (e.g., permission to open the encrypted file and write to the encrypted file; permission to decrypt the encrypted file).

The central management computing module 216, in response to determining that the additional user 254 is authorized for the file, obtains from the secure location 222, the cryptographic key. The central management computing module 216 decrypts the encrypted cryptographic key. That is, the central management computing module 216 decrypts the encrypted cryptographic key utilizing an additional organization private key—a decrypted cryptographic key. The additional organization private key is stored at the secure location 222 and is associated with the additional organization ID (that was included by the header of the file). The central management computing module 216, after decrypting the encrypted cryptographic key using the additional organization private key, encrypts the decrypted cryptographic key using the random public key obtained from the additional client computing device 210. Specifically, the random public key sent by the additional secure file computing module 262 is used to encrypt the decrypted cryptographic key—to generate an encrypted cryptographic key. The central management computing module 216, after encrypting the decrypted cryptographic key using the random public key, provides, to the additional secure file computing module 262, the encrypted cryptographic key.

The additional secure file computing module 262 decrypts the cryptographic key. Specifically, the additional secure file computing module 262 decrypts the cryptographic key using a private key of the random key pair. That is, the additional secure file computing module 262 decrypts the cryptographic key using the private key of the random key pair that corresponds to the public key that was provided to the central management computing module 216. The additional secure file computing module 262, after decrypting the encrypted cryptographic key using the private key, decrypts the file utilizing the cryptographic key (the decrypted cryptographic key). In some examples, the additional secure file computing module 262 utilizes the cryptographic key and the initialization vector (IV) to decrypt the encrypted file content of the file.

In some examples, in response to transferring the file to the additional client computing device 210 from the client computing device 202, the secure file computing module 212 provides a communication to the central management computing module 216 indicating the transfer of the file to the additional client computing device 210. The central management computing module 216, in response to receiving the communication, can log the transfer of the file to the additional client computing device 210. Specifically, the central management computing module 216 updates the log (stored at the storage device 220) to indicate the transmission of the file to the additional client computing device 210, that the file was transmitted from the client computing device 202, a time of the transmission, and similar parameters.

In some examples, the mode of transmission of the file from the client computing device 202 to the additional client computing device 210 can be via one or more communication types, including an electronic mail (email) communication; however, other modes of transmission are possible. For example, the file can be uploaded to a third-party server that is accessible by both computing devices 202, 210.

In some examples, when the additional computing device 210 is internal to the organization that the client computing device 202 is a part of, the another organization (of the additional computing device 210) and the organization (of the client computing device 202) are the same; the another organization ID and the organization ID are the same; and the another organization private key and the organization private key are the same. In some examples, when the additional computing device 210 is external to the organization that the client computing device 202 is a part of, the another organization (of the additional computing device 210) and the organization (of the client computing device 202) are different; the another organization ID and the organization ID are different; and the another organization private key and the organization private key are different.

In some examples, the central management computing module 216 determines that the additional user 254 is not authorized for the file. That is, the central management computing module 216 determines that the additional user 254 is not authorized for the file based on i) the file ID and ii) the additional user token. Specifically, the central management computing module 216 identifies, based on the additional user token, a user-specific data access role associated with the additional user 254. The central management computing module 216 further compares the user-specific data role indicated by the additional token with one or more user-specific data access roles associated with the file that are indicated as authorized for access to the file. The central management computing module 216 determines, based on the comparing, that the additional user 254 is not authorized for the file. That is, the storage device 220 can indicate, per a table, that for the file ID, that the additional user token is not authorized for the file. The central management computing module 216, in response to determining that the additional user 254 is not authorized for the file, does not enable decryption of the file at the additional client computing device 210.

In some examples, the additional client computing device 210 does not include the additional secure file computing module 262. That is, the additional secure file computing module 262 was not installed and/or enabled at the additional client computing device 210; or the additional secure file computing module 262 was disabled at the additional client computing device 210. To that end, when the additional client computing device 210 does not include the additional secure file computing module 262, decryption of the file at the additional client computing device 210 is not enabled.

Offline Access

In some examples, access to the protected files is typically facilitated with login credentials. Thus, a client computing device would need to be connected to the central management computing device 204 via the network 224—the client computing device 202 is "online." For offline access, the secure file computing module 212 writes necessary information related to offline access permission to the file header (metadata) such that subsequent offline access can be verified and enabled.

The secure file computing module 212 marks the file as offline accessible. For example, the user 250 provides input at the client computing device 202 indicating that the file is offline accessible. The secure file computing module 212 configures the file to indicate i) a maximum number of attempts the file can be accessed when a client computing device is not connected to the central management computing device 204 and ii) an expiration time to access the file. The secure file computing module 212 encrypts the file encryption key, the maximum access attempts, and the expiration time using a user provided password. The secure file computing module 212 updates the header of the file to include the encrypted information bundle.

Figure 5:
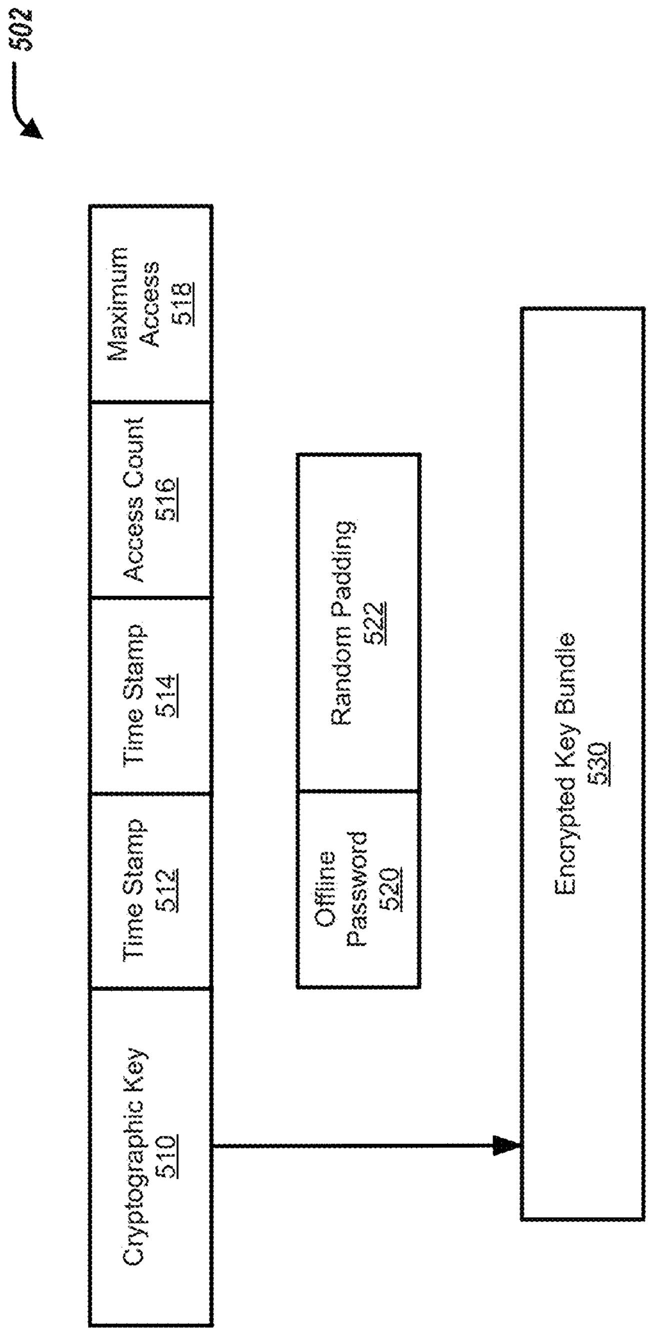
FIG. 5 illustrates a block diagram of offline access to digital files.

FIG. 5 illustrates a block diagram of offline access to digital files, including an encrypted information bundle. Specifically, the header (metadata) 502 can include the cryptographic key 510, a time stamp 512 (start date/time for offline access), a time stamp 514 (end date/time for offline access), an access count 516 (the number of times the file has been access offline), and a maximum access parameter 518 (maximum number of times the file has been accessed offline). The secure file computing module 212 can update the header 502 to include an offline password 520 and random padding 522, to form the encrypted key bundle 530. The offline password 520 can be entered by a user at a client computing device for offline access to encrypt the metadata with the random padding 522.

To access the file while offline, the secure file computing module 212 can detect an attempt to access the file. The secure file computing module 212 can determine, in response to detecting the attempt to access the file, that the client computing device 202 is not connected to the central management computing device 204 (e.g., the client computing device 202 is offline). The secure file computing module 212, in response to determining that the client computing device 202 is not connected to the central management computing device 204, obtains user input at the client computing device 202 indicating the password associated with the file. In some examples, the secure file computing module 212, in response to detecting the attempt to access the file, provides a prompt at the client computing device 202 for the password associated with the file when the header of the file includes offline access metadata, as described with respect to FIG. 5.

The secure file computing module 212 decrypts the encryption key based on the password. Specifically, the secure file computing module 212 decrypts the encryption key using the password (provided by the user) and random padding 522 to decrypt the encryption key. If the user provided the correct password (based on a matching with the offline password 520), the secure file computing module 212 will proceed; otherwise, the secure file computing module 212 will re-prompt the user 250 to enter the correct password.

The secure file computing module 212 validates that i) the access attempt count of the file is less than the maximum number of attempts and ii) the expiration time has not expired. That is, the secure file computing module 212 determines that the access count 516 is less than the maximum access parameter 518 (as both indicated in the header of the file), and the expiration time has not occurred per the time stamp 512 and the time stamp 514. The secure file computing module 212 decrypts, in response to the validation, the file using the encryption key. That is, the secure file computing module 212 decrypts the file using the cryptographic key 510. The secure file computing module 212, in response to decrypting the file, launches a computer-executable application 228 associated with the file to access the file at the client computing device 202. When the file is closed, updates/modifications to the file are saved to the encrypted file, and the access count 516 is updated. The secure file computing module 212 regenerates the random padding and re-encrypts the header using the offline password 520.

When the access count 516 exceeds the maximum access parameter 518 or the time duration is exhausted per the time stamp 512, 514, the secure file computing module 212 is unable to provide access to the file (without the client computing device 202 becoming online and the user 250 providing login credentials). When the client computing device 202 becomes online (and connected to the client computing device 202) and the user 250 provides login credentials, the meta information of the header related to offline access is automatically removed.

Encryption

Referring back to FIG. 2, the secure file computing module 212 can facilitate encryption of the file. Specifically, the secure file computing module 212 can make a copy of the file to be encrypted, and store the copied file with the original file name with an extension indicating the first encryption method, and the backup file extension (hidden file extension). For example, the file name of the original file can include filename.txt, and the copied file can include filename.txt.encryptionextension.bak. Further, the secure file computing module 212 computes the file hash of the original file. For example, the secure file computing module 212 can compute a MD5 file hash of the original file. In some examples, when the file size is large (e.g., more than 200 MB), the secure file computing module 212 can compute the file hash of the an initial portion and a final portion of the original file.

The secure file computing module 212 can generate the cryptographic key. In some examples, the secure file computing module 212 generates a random AES key with a random IV. In some examples, the secure file computing module 212 obtains a public key for the organization—a public organization key (e.g., stored at the storage device 214)—to encrypt the random AES key.

The secure file computing module 212 clears all contents in the original file and updates the file extension of the original file. Thus, all attributes of the original file can be preserved, including security attributes. Specifically, the secure file computing module 212 will update the file extension of the original file to include the extension indicating the first encryption method. For example, the file name of the original file can be updated to include filename.txt.encryptionextension.

The secure file computing module 212 obtains, from the central management computing module 216, the file ID associated with the file.

The secure file computing module 212 updates the header of the file to include the organization ID and the file ID. That is, the secure file computing module 212 updates the file to include the header (e.g., 4k—4096 bytes), with the header including metadata associated with the organization ID, the file ID, the file hash, the encrypted cryptographic key, and the IV.

The secure file computing module 212 encrypts the file utilizing the cryptographic key. That is, the secure file computing module 212 reads the file contents of the copied file (e.g., filename.txt.encryptionextension.bak), encrypts the file contents using the randomly generated encryption key, and stores the encrypted content into the renamed original file (e.g., filename.txt.encryptionextension) sequentially. In some examples, the secure file computing module 212 can further enhance the encryption security, including utilizing AES Cipher Block Chaining (CBC) to encrypt the file contents with the AES key and the IV.

The secure file computing module 212 stores the file, e.g., at the storage device 214. In some examples, the secure file computing module 212 deletes the copied file (e.g., filename.txt.encryptionextension.bak).

File Classification

Figure 6A:
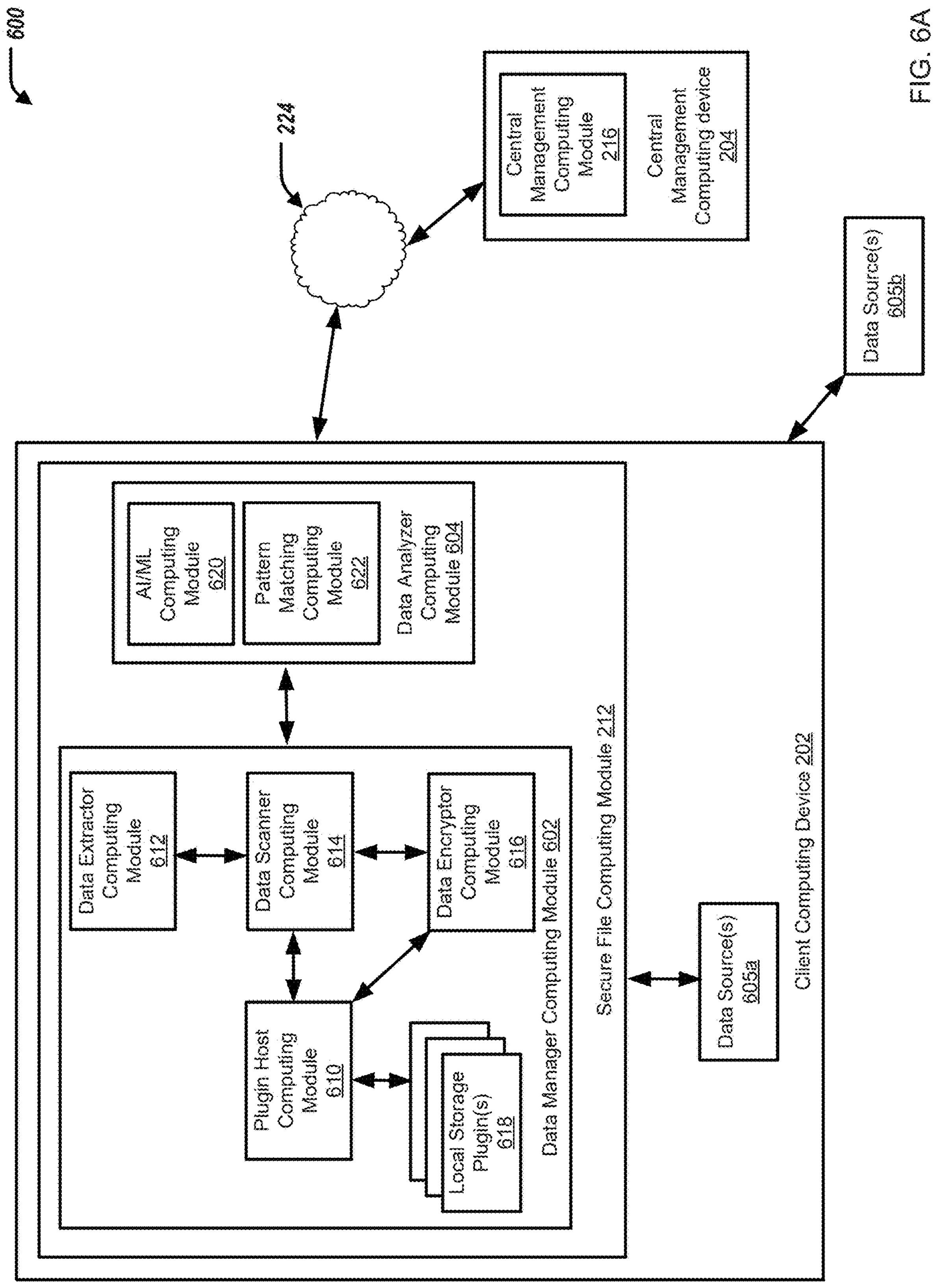
FIG. 6A illustrates a block diagram of a computing environment for the data analysis of files, in a first implementation.

FIG. 6A illustrates a block diagram of a computing environment 600 for the data analysis of files, in a first implementation. The environment 600 can include the client computing device 202, the central management computing device 204, and the network 224. The client computing device 202 can include the secure file computing module 212, and data sources 605(*a*). The data manager computing module 602 can include a plugin host computing module 610, a data extractor computing module 612, a data scanner computing module 614, a data encryptor computing module 616, and local storage plugin(s) 618. The data analyzer computing module 604 can include an artificial intelligence (AI)/machine learning (ML) computing module 620, and a pattern matching computing module 622. The environment 600 can further include data sources 605*b* (with data sources 605*a* and 605*b* collectively referred to as data sources 605).

In some implementations, the data manager computing module 602 and the data analyzer computing module 604 can automatically scan and monitor the data sources 605 (e.g., for sensitive and/or confidential data) to automatically classify the data/files based on data classification rules. The data manager computing module 602 can scan and monitor the data sources 605 for new files, and leverage the data analyzer computing module 604 to identify one or more categories (info types). Once the files are classified, data encryption can be automatically applied based on the data classification rules. The central management computing module 216 classifies the files based on the classification rules. The data analyzer computing module 604 can implement AI/ML or pattern matching with regular expressions to identify the categories of the files.

For each type of data source 605, the data manager computing module 602 includes a corresponding storage plugin 618 to handle communication with the data sources 605. The data sources 605 can include local storage (data sources 605*a*) or any other types of storage, including cloud storage (data sources 605*b*). The storage plugins 618 can wrap the interactions with the data sources 605 and provide the same interface for the plugin host computing module 610 independent of the underlying data storage 605.

In some examples, the categories (info types) can include such categories as credit card, financial data, health information, and the like.

Figure 6B:
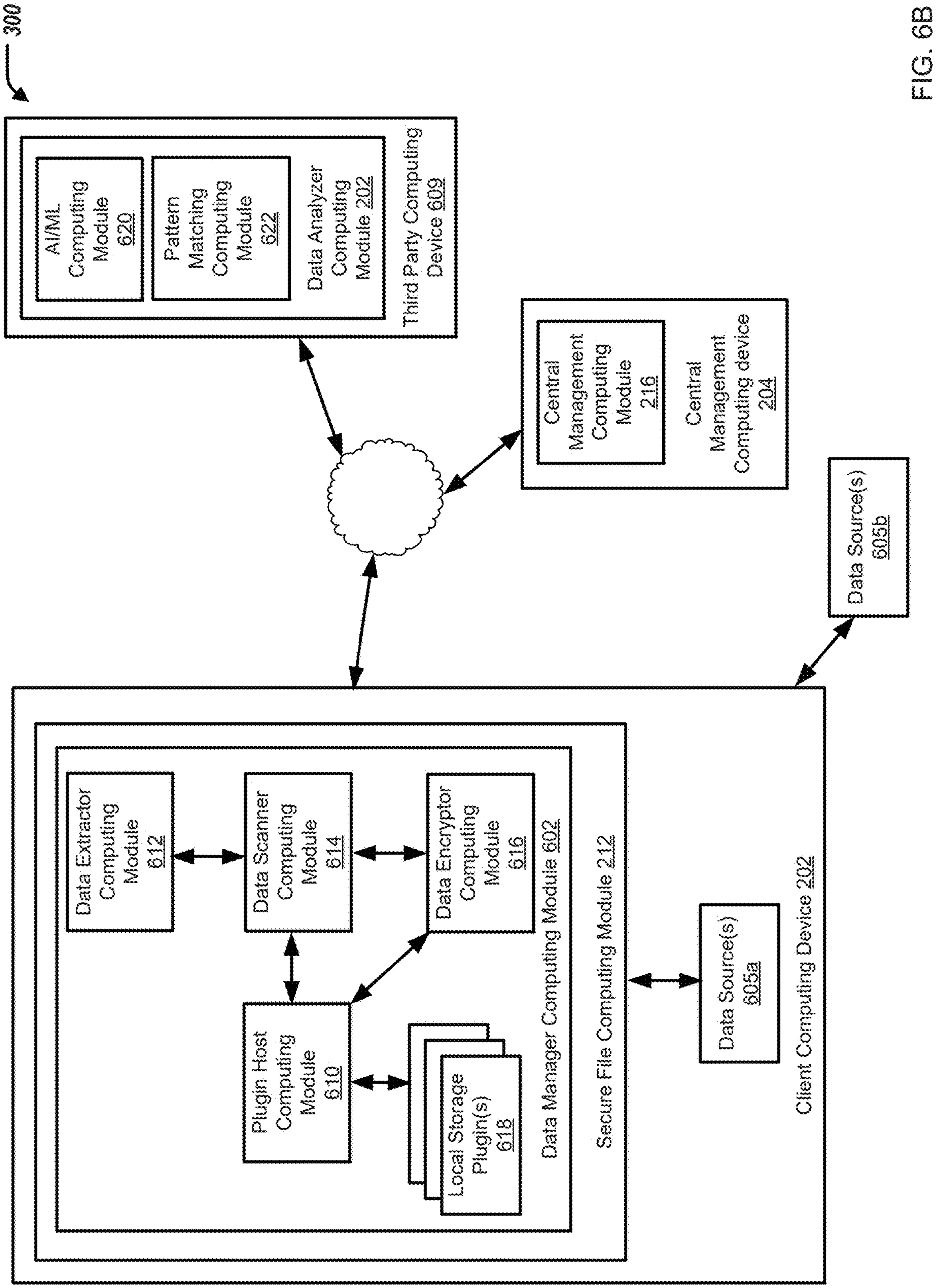
FIG. 6B illustrates a block diagram of a computing environment for the data analysis of files, in a second implementation.
Figure 6C:
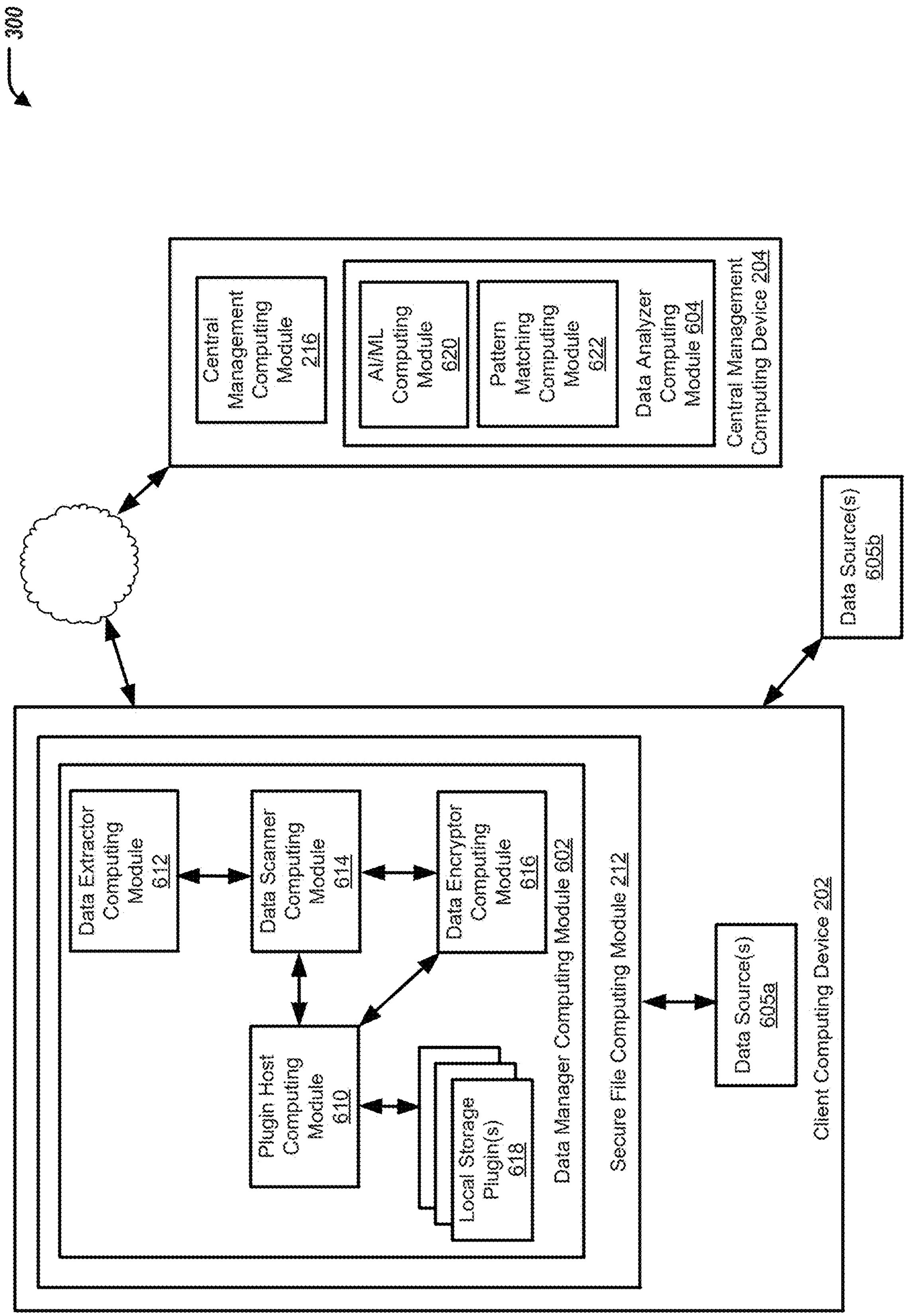
FIG. 6C illustrates a block diagram of a computing environment for the data analysis of files, in a third implementation.

FIG. 6B illustrates a block diagram of a computing environment for the data analysis of files, in a second implementation. Specifically, in some embodiments, the data analyzer computing module 202 can be located at a third party computing device 609. FIG. 6C illustrates a block diagram of a computing environment for the data analysis of files, in a third implementation. Specifically, in some embodiments, the data analyzer computing module 604 is located at the central management computing device 204.

Figure 7:
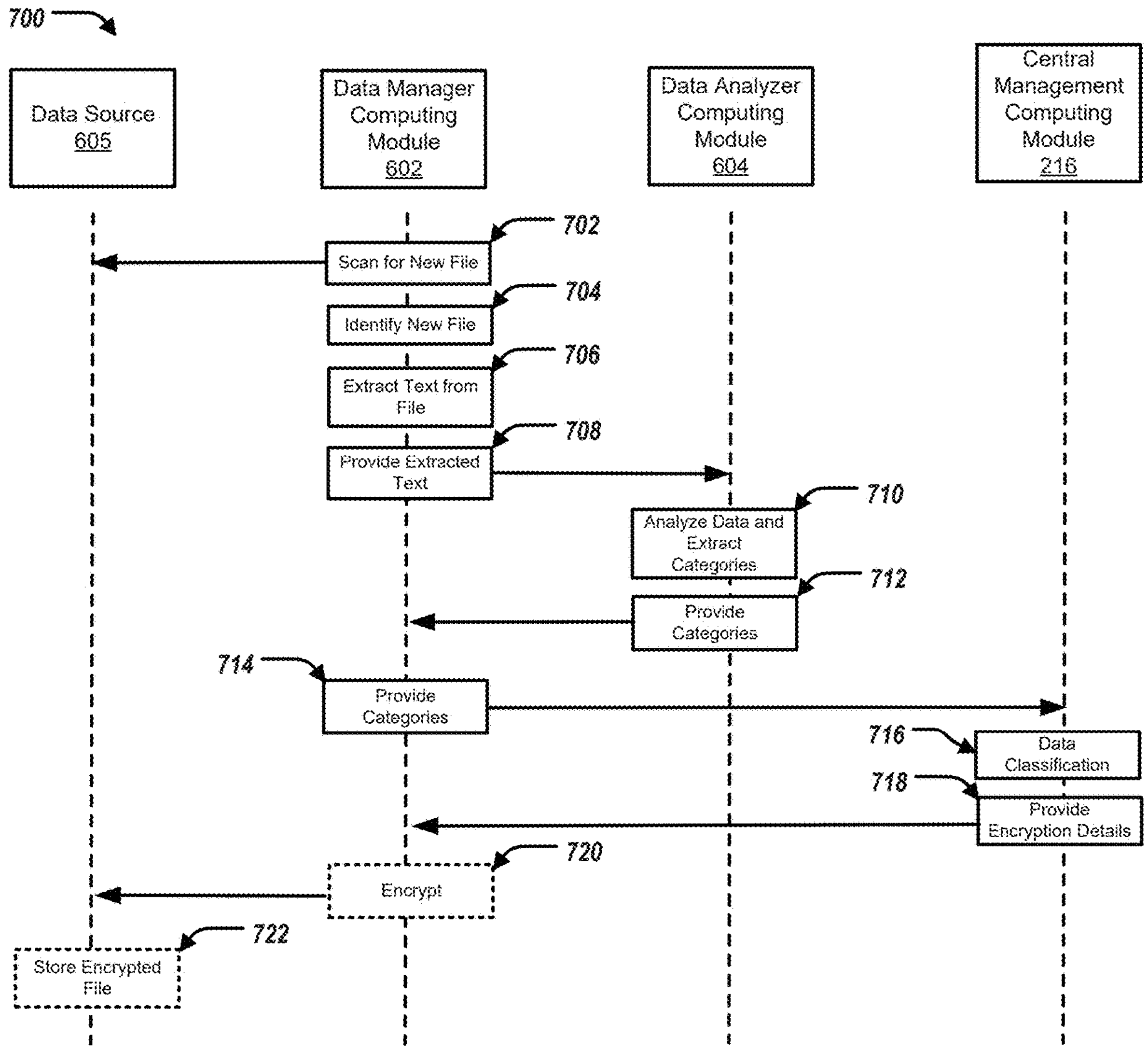
FIG. 7 illustrates a swim-lane diagram of analysis and classification of files.

FIG. 7 illustrates a swim-lane diagram depicting selected elements of an embodiment of a method 700 for analysis and classification of files. The method 700 may be performed by the client computing device 202, the central management computing device 204, the IAM computing device 206, and the additional computing device 210, and with reference to FIGS. 1-2, 6A, 6B, 6C. It is noted that certain operations described in method 700 may be optional or may be rearranged in different embodiments.

The data manager computing module 602 monitors the data sources 605, at 702. Specifically, the data manager computing module 602, and in particular, the data scanner computing module 614, scans and monitors the data sources 605 to track processing status of files in the data sources 605. When the data source 605 is file based, the data manager computing module 602 tracks the files that have been processed—when an existing file is updated, the data manager computing module 602 will process the file again to identify any additional categories newly associated with the file. When the data source 605 is a database, the data manager computing module 602 tracks all databases, schemas, tables, and columns such that when an existing schema is updated, the data manager computing module 602 will process the database again to identify any additional columns that are introduced.

The data manager computing module 602 identifies, based on the monitoring, the file, at 704.

The data manager computing module 602 extracts text from the file, at 706. Specifically, the data extractor computing module 612 extracts data from the file as text. For each piece of data, the data manager extracts and organizes the text content including, when the data is a file, extracting the file contents using a Java-based command line tool (e.g., Tika), and when the data is a database column, using the metadata and sample data directly.

The data manager computing module 602 provides the extracted text to the data analyzer computing module 604, at 708. Specifically, the data extractor computing module 612 provides the extracted text to the data analyzer computing module 604 by calling the REST API of the data analyzer computing module 604. When the data is a file, the data extractor computing module 612 provides the extracted text of the data analyzer computing module 604, and when the data is a database column, the data extractor computing module 612 provides relevant schema info and sample data.

The data analyzer computing module 604 identifies, based on the text of the file, one or more categories of the file, at 710. The data analyzer computing module 604 can implement the AI/ML computing module 620 and/or the pattern matching computing module 622 to identify the categories (info types) of the file based on the extracted text of the file. In some examples, the data analyzer computing module 604 can further, in addition to identifying the categories of the file, identify a number of occurrences and confidence level for each category.

The data analyzer computing module 604 provides data indicating the categories of the file to the data manager computing module 602, at 712. The data manager computing module 602 provides the data indicating the categories of the file to the central management computing module 216, at 714.

The central management computing module 216 determines, based on a mapping, a data classification of the file based on the categories of the file, at 716. The mapping can be stored at the storage device 220. In some examples, the mapping is a user-defined mapping between categories and data classifications. With the user-defined mapping, the user can be specific whether to automatically encrypt the file when the file is classified with that category. In some examples, the mapping can include a default set of data classifications, which can map known categories to default data classifications. In some examples, the user can update the mapping between categories and associated data classifications. In some examples, when the file includes multiple categories, the mapping can indicate multiple data classifications. In some examples, when the mapping indicates multiple data classifications, the central management computing module 216 can apply the higher-level classification.

The central management computing module 216 provides, based on the data protection rules, encryption details to the data manager computing module 602, at 718. In some examples, the data protection rules indicate an encryption of the file, and the central management computing module 216 provides details regarding the encryption status of the file to the data manager computing module 602.

The data manager computing module 602 encrypts the file, at 720. Specifically, the data encryptor computing module 616 encrypts the file automatically.

The encrypted file is stored, at 722. For example, the file can be stored at the data source 605 associated with the file. In some examples, for the file, the document type, categories, confidence score, and number of occurrences can be stored at the data source as well.

Portal 232

The portal 232 can provide, e.g., to the user (admin) 252, a graphical interface for handling encryption keys, management of file classification, management of data classification rules, management of data protection rules, cataloging, data access roles, and all file operation logs and file access audit logs. The file catalog can support file searching/filter, file classification, and file tagging. The file classification can share the same classification categories as the data classifications. The file operation log can track all file operations, such as file encryption, file decryption, deletion, and modification. The file operation log is searchable and sortable by user, computer, file, and time range. The file access log can track all file read access associated with any file that is dynamically opened for read/write. The file access log can be searchable and sortable by user, computer, file, and time range.

Shell Extension 226

As described herein, the shell extension 226 can indicate (via a graphical user interface at the client computing device 202) an illustration of an overlay on an icon representing the file to indicate that the file is encrypted. The shell extension 226 can provide a contextual menu to open, encrypt, decrypt the file. The shell extension 226 ingrates the functions of the secure file computing module 212 into the OS shell application 230 to provide a familiar and intuitive interface experience. The shell extension 226 can preserve the original graphical representation (icon) for the file when the encryption extension is added to the original file name such that the user can easily recognize the original file type. The shell extension 226 can overlay a graphic related to the encryption method (e.g., logo) on the graphical representation (icon) of the file to indicate that the file is encrypted. The shell extension 226 can further provide a context menu to include options associated with encryption such that the user can easily access encryption/decryption capabilities.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, “or” is inclusive and not exclusive, unless expressly indicated otherwise or indicated otherwise by context. Therefore, herein, “A or B” means “A, B, or both,” unless expressly indicated otherwise or indicated otherwise by context. Moreover, “and” is both joint and several, unless expressly indicated otherwise or indicated otherwise by context. Therefore, herein, “A and B” means “A and B, jointly or severally,” unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method of managing access to digital files in a computing environment, including:

receiving, by a secure file computing module at a client computing device, a user token representing credentials of a user associated with the client computing device;

storing a file at a storage device accessible by the client computing device, the file encrypted with a first encryption method;

detecting, by the secure file computing module, an attempt to access the file utilizing the client computing device;

in response to detecting the attempt, identifying a header of the file, including identifying a file identifier (ID) and an organization identifier (ID) of the header;

providing, by the client computing device and to a central management computing device, the file ID, the organization ID, a public key of a random key pair, and the user token;

determining, by the central management computing device, that the user is authorized for the file based on i) the file ID and ii) the user token;

in response to determining that the user is authorized for the file:

obtaining, by the central management computing device and from a database at the central management computing device, a cryptographic key, wherein the cryptographic key is stored at the database of the central management computing device independent and separate of the file stored at the storage device at the client computing device, wherein the cryptographic key is encrypted using an organization public key;

decrypting, by the central management computing device, the cryptographic key utilizing an organization private key, the organization private key stored in a secure location and associated with the organization ID;

after decrypting the cryptographic key using the organization private key, encrypting, by the central management computing device, the cryptographic key using the random public key obtained from the client computing device;

after encrypting the cryptographic key using the random public key, providing, by the central management computing device and to the client computing device, the cryptographic key;

decrypting, by the secure file computing module, the cryptographic key using a private key of the random key pair; and after decrypting the cryptographic key using the private key, decrypting, by the secure file computing module, the file utilizing the cryptographic key.

2. The computer-implemented method of claim 1, wherein the cryptographic key is a key used with an advanced cryptographic algorithm.

3. The computer-implemented method of claim 1, further including:

in response to decrypting the file, launching a computer-executable application associated with the file to access the file at the client computing device.

4. The computer-implemented method of claim 3, wherein the file is stored at a storage device of the client computing device, an external storage device coupled to the client computing device, a cloud storage device that the client computing device is in communication with, and/or a third-party storage device at an external storage location.

5. The computer-implemented method of claim 3, wherein the first encryption method is independent of the computer-executable application, and non-native to the client computing device.

6. The computer-implemented method of claim 3, further including:

detecting, by the secure file computing module, an update to the file;

in response to detecting the update, providing, by the secure file computing module, a communication to the central management computing device indicating the update to the file; and logging, by the central management computing device and at a storage device, the update to the file.

7. The computer-implemented method of claim 1, wherein decrypting the file utilizing the cryptographic key further includes storing, by the secure file computing module, the decrypted file in a temporary storage location at the client computing device.

8. The computer-implemented method of claim 7, further including:

in response to decrypting the file, encrypting, by the secure file computing module, the file at the temporary storage location with a second encryption method differing from the first encryption method.

9. The computer-implemented method of claim 8, wherein the file is decrypted utilizing the cryptographic key and the file is encrypted using the second encryption method concurrently.

10. The computer-implemented method of claim 8, wherein the second encryption method is associated with an operating system (OS) of the client computing device.

11. The computer-implemented method of claim 7, further including:

detecting a close of the file at the client computing device, and in response, removing, by the secure file computing module, the temporary storage location at the client computing device.

12. The computer-implemented method of claim 1, further including:

transferring, by the client computing device, the encrypted file to another client computing device that is internal or external to an organization;

when the another client computing device includes an another secure file computing module:

receiving, by the another secure file computing module at the another client computing device, another user token representing credentials of another user associated with the another client computing device;

detecting, by the another secure file computing module, another attempt to access the file utilizing the another client computing device;

in response to detecting the another attempt, identifying the header of the file, including identifying the file ID and an another organization ID of the header;

providing, by the another client computing device and to the central management computing device, the file ID, the another organization ID, a public key of a random key pair, and the another user token;

determining, by the central management computing device that the another user is authorized for the file based on i) the file ID and ii) the another user token;

in response to determining that the another user is authorized for the file:

obtaining, by the central management computing device and from the database, the cryptographic key;

decrypting, by the central management computing device, the cryptographic key utilizing an another organization private key, the another organization private key stored in the secure location and associated with the another organization ID;

after decrypting the cryptographic key using the another organization private key, encrypting, by the central management computing device, the cryptographic key using the random public key obtained from the another client computing device;

after encrypting the cryptographic key using the random public key, providing, by the central management computing device and to the another client computing device, the cryptographic key;

decrypting, by the another secure file computing module, the cryptographic key using a private key of the random key pair; and after decrypting the cryptographic key using the private key, decrypting, by the another secure file computing module, the file utilizing the cryptographic key.

13. The computer-implemented method of claim 12, wherein the another organization and the organization are the same, the another organization ID and the organization ID are the same, and the another organization private key and the organization private key are the same.

14. The computer-implemented method of claim 12, where the another organization and the organization are different, the another organization ID and the organization ID are different, and the another organization private key and the organization private key are different.

15. The computer-implemented method of claim 12, further including:

determining, by the central management computing device, that the another user is not authorized for the file based on i) the file ID and ii) the another user token; and in response to determining that the another user is not authorized for the file, not enabling decryption of the file at the another client computing device.

16. The computer-implemented method of claim 12, further including:

when the another client computing device does not include the another secure file computing module, not enabling decryption of the file at the another client computing device.

17. The computer-implemented method of claim 12, further including:

in response to transferring the file to the another computing device, providing, by the secure file computing module, a communication to the central management computing device indicating the transfer of the file to the another computing device; and logging, by the central management computing device and at a storage device, the transfer of the file to the another computing device.

18. The computer-implemented method of claim 12, wherein transferring the file to the another computing device includes transferring the file to the another computing device via an electronic mail communication.

19. The computer-implemented method of claim 1, further including:

marking, by the secure file computing module, the file as offline accessible;

configuring the file, by the secure file computing module, to indicate i) a maximum number of attempts the file can be accessed when the client computing device is not connected to the central management computing device and ii) an expiration time to access the file;

encrypting, by the secure file computing module, the file encryption key, the maximum access attempts, and the expiration time using a user provided password into an encrypted information bundle; and updating, by the secure file computing module, the header of the file to include the encrypted information bundle.

20. The computer-implemented method of claim 19, further including:

detecting, by the secure file computing module, an attempt to access the file;

in response to detecting the attempt to access the file, determining that the client computing device is not connected to the central management computing device;

in response to determining that the client computing device is not connected to the central management computing device:

obtaining user input indicating the password associated with the file;

decrypting, by the secure file computing module, the encryption key based on the password;

validating, by the secure file computing module, that i) the access attempt count of the file is less than the maximum number of attempts and ii) the expiration time has not expired;

in response to the validation, decrypting, by the secure file computing module, the file using the encryption key; and in response to decrypting the file, launching a computer-executable application associated with the file to access the file utilizing the client computing device.

21. The computer-implemented method of claim 1, the method further including:

encrypting the file, including:

generating, by the secure file computing module, the cryptographic key;

updating, by the secure file computing module, a file extension of the file;

obtaining, by the secure file computing module and from the central management computing module, the file ID;

updating, by the secure file computing module, the header of the file to include the organization ID, and the file ID;

encrypting, by the secure file computing module, the file utilizing the cryptographic key; and storing, by the secure file computing module, the file.

22. The computer-implemented method of claim 21, further including:

monitoring, by the secure file computing module, one or more data sources;

identifying, based on the monitoring and by the secure file computing module, one or more files, including the file;

extracting, by the secure file computing module, text from the file;

identifying, by a data analyzer computing module and based on the text of the file, one or more categories of the file;

determining, by the central management computing module and based on a mapping, a data classification of the file based on the categories of the file;

determining, by the central management computing module, that the data protection rules indicate encryption of the file; and encrypting, by the secure file computing module, the file based on the indication of encryption of the file by the mapping.

23. The computer-implemented method of claim 22, wherein determining the data classification of the file based on the categories of the file is performed utilizing machine learning, artificial intelligence, pattern matching, or a combination of those.

24. The computer-implemented method of claim 1, wherein determining, by the central management computing module, that the user is authorized for the file further includes:

identifying, based on the user token, a user-specific data access role associated with the user;

comparing, by the central management computing device, the user-specific data access role indicated by the token with one or more user-specific data access roles associated with the file that are indicated as authorized for access to the file; and determining, based on the comparing and by the central management computing device, that the user is authorized for the file.

25. The computer-implemented method of claim 24, wherein determining that the user is authorized for the file includes determining that the user has read-only access to the file, or write/read access to the file.

26. An information handling system comprising a processor having access to memory media storing instructions executable by the processor to perform operations, comprising:

receiving, by a secure file computing module at a client computing device, a user token representing credentials of a user associated with the client computing device;

storing a file at a storage device accessible by the client computing device, the file encrypted with a first encryption method;

detecting, by the secure file computing module, an attempt to access the file utilizing the client computing device;

in response to detecting the attempt, identifying a header of the file, including identifying a file identifier (ID) and an organization identifier (ID) of the header;

providing, by the client computing device and to a central management computing device, the file ID, the organization ID, a public key of a random key pair, and the user token;

determining, by the central management computing device, that the user is authorized for the file based on i) the file ID and ii) the user token;

in response to determining that the user is authorized for the file:

obtaining, by the central management computing device and from a database at the central management computing device, a cryptographic key, wherein the cryptographic key is stored at the database of the central management computing device independent and separate of the file stored at the storage device at the client computing device, wherein the cryptographic key is encrypted using an organization public key;

decrypting, by the central management computing device, the cryptographic key utilizing an organization private key, the organization private key stored in a secure location and associated with the organization ID;

after decrypting the cryptographic key using the organization private key, encrypting, by the central management computing device, the cryptographic key using the random public key obtained from the client computing device;

after encrypting the cryptographic key using the random public key, providing, by the central management computing device and to the client computing device, the cryptographic key;

decrypting, by the secure file computing module, the cryptographic key using a private key of the random key pair; and after decrypting the cryptographic key using the private key, decrypting, by the secure file computing module, the file utilizing the cryptographic key.

27. A non-transitory computer-readable medium storing software comprising instructions executable by one or more computers which, upon such execution, cause the one or more computers to perform operations comprising:

receiving, by a secure file computing module at a client computing device, a user token representing credentials of a user associated with the client computing device;

storing a file at a storage device accessible by the client computing device, the file encrypted with a first encryption method;

detecting, by the secure file computing module, an attempt to access the file utilizing the client computing device;

in response to detecting the attempt, identifying a header of the file, including identifying a file identifier (ID) and an organization identifier (ID) of the header;

providing, by the client computing device and to a central management computing device, the file ID, the organization ID, a public key of a random key pair, and the user token;

determining, by the central management computing device, that the user is authorized for the file based on i) the file ID and ii) the user token;

in response to determining that the user is authorized for the file:

obtaining, by the central management computing device and from a database at the central management computing device, a cryptographic key, wherein the cryptographic key is stored at the database of the central management computing device independent and separate of the file stored at the storage device at the client computing device, wherein the cryptographic key is encrypted using an organization public key;

decrypting, by the central management computing device, the cryptographic key utilizing an organization private key, the organization private key stored in a secure location and associated with the organization ID;

after decrypting the cryptographic key using the organization private key, encrypting, by the central management computing device, the cryptographic key using the random public key obtained from the client computing device;

after encrypting the cryptographic key using the random public key, providing, by the central management computing device and to the client computing device, the cryptographic key;

decrypting, by the secure file computing module, the cryptographic key using a private key of the random key pair; and after decrypting the cryptographic key using the private key, decrypting, by the secure file computing module, the file utilizing the cryptographic key.

* * * * *